United States Patent Office 2,798,064
Patented July 2, 1957

2,798,064

DISAZO-DYESTUFFS

Willy Mueller, Riehen, Switzerland, assignor to Ciba Limited, Basel, Switzerland, a Swiss firm No Drawing. Application September 8, 1953,
Serial No. 379,085

Claims priority, application Switzerland
September 12, 1952

4 Claims. (Cl. 260—176)

This invention provides new water-insoluble disazo-dyestuffs which, like the dyestuff of the formula (1)

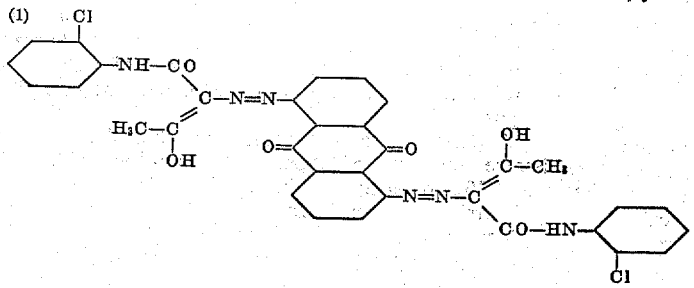

correspond to the general formula (2) $R_2-N=N-R_1-N=N-R_2$ in which $R_1$ represents an anthraquinone radical free from groups imparting solubility and in which the two carbon atoms to which the azo linkages are bound are separated from one another by at least three carbon atoms of the anthraquinone nucleus, and $R_2$ represents the radical of an azo component free from groups imparting solubility and bound to the azo linkage in a position vicinal to a hydroxyl group.

The invention also includes a process for making disazo-dyestuffs of the above general formula, wherein a tetrazo compound of a diaminoanthraquinone, which is free from groups imparting solubility and in which the two carbon atoms to which the diazotized amino groups are bound are separated from one another by at least three carbon atoms of the anthraquinone nucleus, is coupled with an azo component free from groups imparting solubility and capable of coupling in a position vicinal to a hydroxyl group.

As will be understood from the foregoing definition, the amino groups must not be bound to the same 6-membered ring of the anthraquinone nucleus. In addition to the amino groups, the anthraquinone nucleus may contain further substituents, especially halogen atoms, such as bromine or chlorine. As examples of suitable diaminoanthraquinones there may be mentioned the following compounds:

1:5-diaminoanthraquinone,
1:6-diaminoanthraquinone,
1:7-diaminoanthraquinone,
2:6-diaminoanthraquinone,
2:7-diaminoanthraquinone,
4:8-dichloro-1:5-diaminoanthraquinone,
2:4:6:8-tetrachloro-1:5-diaminoanthraquinone,
2:6-dibromo-1:5-diaminoanthraquinone,
2:4:6:8-tetrabromo-1:5-diaminoanthraquinone,
1:5-dichloro-2:6-diaminoanthraquinone,
1:5-dibromo-2:6-diaminoanthraquinone,
3:7-dibromo-2:6-diaminoanthraquinone,
1:3:5:7-tetrabromo-2:6-diaminoanthraquinone,
3:6-dibromo-2:7-diaminoanthraquinone.

As azo components there come into consideration compounds which are also free from groups imparting solubility and which are capable of coupling in a position vicinal to a hydroxyl group. The hydroxyl group may be a hydroxyl group bound to an aryl carbon atom or an enolized keto group.

Among the azo components of the kind first mentioned above, for example, there may be used hydroxynaphthalenes capable of coupling in a position vicinal to the hydroxyl group, such as 1-hydroxy-4-methylnaphthalene, 1-hydroxy-5:8-dichloronaphthalene, 2-hydroxynaphthalene or 2-hydroxy-6-bromonaphthalene. There are also useful azo components which contain a carboxylic acid-aryl amide group in a position vicinal to the hydroxyl group imparting coupling properties and bound to an aryl carbon atom. As examples there may be mentioned 2-hydroxynaphthalene-3-carboxylic acid naphthyl-(1)-amid, -phenylamide or -2′-methoxyphenylamide, 2-hydroxycarbazole-3-carboxylic acid anilide or -4′-chloranilide, 2-hydroxydiphenylene oxide-3-carboxylic acid anilide or -2′:5′-dimethoxyanilide.

As azo components in which coupling takes place in a position vicinal to an enolizable keto group, there may be mentioned for example, barbituric acid, acylacetylamino compounds and pyrazolones. Among the acylacetylamino compounds there may be used acylacetylamino-aryl compounds, for example, benzoylacetyl amino-aryl compounds, and especially acetoacetylamino-aryl compounds of the benzene series. The aryl radical bound to the acyl acetylamino group may contain, in addition to this group, other substituents incapable of imparting solubility such, for example, as alkyl or alkoxy groups of low molecular weight or halogen atoms such as chlorine, and also acetylamino groups or sulfonic acid amide groups. There also come into consideration azo components of which the acyl acetylamino group is bound to a carbon atom in a heterocyclic ring. As examples of suitable azo components there may be mentioned 1-benzoylacetylaminobenzene, 1-benzoylacetylamino-2-methoxy-5-methylbenzene and also acetoacetylamino compounds derived from the following amines of the benzene series: Aminobenzene, 1-amino-2-chlorobenzene, 1-amino-4-methylbenzene, 1-amino-2-methoxybenzene, 1-amino-2:5-dichlorobenzene, 1-amino-2:4-dimethyl-5-chlorobenzene, 1-amino-2-chloro-4-acetylamino-5-methoxybenzene, 1-amino-2-chloro-5-trifluoromethylbenzene, 1-amino-2:5-dimethoxy-4-chlorobenzene, 1-aminobenzene-3-sulfonic acid amide, 1-amino-2-methoxy-5-methylbenzene, 1-amino-2:6-dimethylbenzene and 1-amino-2-methylbenzene.

As azo components containing an acyl acetylamino group bound to a carbon atom of a heterocyclic ring there may be mentioned, for example, 2-acetoacetylamino-6-methoxybenzthiazole.

Among the pyrazolones which can be used as azo components to yield valuable dyestuffs there may be mentioned, for example, 1-aryl-3-methyl-5-pyrazolones, and especially 1-phenyl-3-methyl-5-pyrazolones. In this case also the aryl radical may contain further substituents. As examples of such azo components there may be mentioned 1-naphthyl-(2)-3-methyl-5-pyrazolone, 1-phenyl-3-methyl-5-pyrazolone, 1-(2'-chlorophenyl)-3-methyl-5-pyrazolone and 1-(2'-methoxy-5'-methylphenyl)-3-methyl-5-pyrazolone.

The diaminoanthraquinones are tetrazotized in known manner, advantageously in concentrated sulfuric acid by means of an alkali nitrite. It is usually of advantage to precipitate and isolate the tetrazo-compound.

The tetrazo-compound so obtained are advantageously coupled with the azo components of the aforesaid kind in a weakly acid, for example, acetic acid medium, and it is generally of advantage to add a wetting or dispersing agent to the coupling mixture. For this purpose wetting and dispersing agents of ionogenic or non-ionogenic character may be used. As ionogenic dispersing agents there may be used, for example Turkey red oil, and as non-ionogenic dispersing agents there may be used polyglycol ethers of fatty alcohols of high molecular weight.

The new disazo-dyestuffs corresponding to the above Formula 2 are valuable pigments and are usually distinguished by their especially good fastness to migration and also by their heat resistance and fastness to solvents. These properties are valuable, for example, for so-called pigment printing, that is to say, printing processes in which a pigment is fixed on a substratum, especially a textile fiber or another sheet-like structure such as paper (for example, wallpaper) or fabrics of glass fibers, by means of a suitable adhesive such as casein, a hardenable artificial plastic, especially a urea-fomaldehyde or melamine-formaldehyde condensation product, solutions or emulsions of polyvinyl chloride or polyvinyl acetate or other emulsions (for example, oil-in-water or water-in-oil emulsions). The new pigments can also be used with good results for other purposes, for example, in a finely dispersed form for dyeing artificial silk from viscose or cellulose ethers or esters or of superpolyamides or superpolyurethanes in the spinning mass, and also for the manufacture of colored lacquers or lacquer formers, solutions or products of acetyl-cellulose, nitrocellulose, natural resins or artificial resins such as polymerisation or condensation resins for example, aminoplasts, phenoplasts, polyvinyl chloride, polystyrene, polyethylene, polyacryl, rubber, casein, silicone and silicone resins. Furthermore, they are also of advantage for the manufacture of colored pencils, cosmetic preparations or laminated plates.

The new dyestuffs can easily be dispersed in the normal manner in masses or compositions of the above kind, and they may be so dispersed with advantage at any stage before such masses or compositions have acquired their final shape. Accordingly, the necessary shaping operations, such as spinning, pressing, hardening, casting, sticking or the like, may be carried out directly in the presence of the pigments, without inhibiting any chemical reactions which the substrata are to undergo such as further polymerisation, condensation etc.

The following examples, illustrate the invention, the parts and percentages being by weight unless otherwise stated and the relationship of parts by weight to parts by volume being the same as that of the kilogram to the liter:

*Example 1*

400 parts of sulfuric acid of 98 percent strength are cooled to 0° C., and 28 parts of sodium nitrite of 100 percent are introduced while stirring at 5–10° C. The whole is then heated to 55–60° C. until a clear solution is obtained, the solution is then cooled to 30° C., and 47.6 parts of 1:5-diaminoanthraquinone are introduced at 30–40° C., while stirring. A thick yellow suspension is formed. When the addition is complete the whole is slowly heated to 50–60° C. until a clear solution is obtained, the solution is then cooled to 30° C., and the solution is maintained at that temperature for a further 30 minutes. The whole is then allowed to cool to 30° C., and the solution is poured on to 600 parts of ice and 100 parts of water. In this manner the tetrazo-compound crystallizes out in yellowish white crystals. The mixture is stirred for a further 30 minutes at 0–5° C., and then filtered and the filter residue is pressed well. The tetrazo-compound remains unchanged in the moist state for several weeks when stored in the cold with the exclusion of light.

42.3 parts of 1-acetoacetylamino-2-chlorobenzene are dissolved by means of 30 parts of sodium hydroxide solution of 30 percent strength in 300 parts of water at 30° C. A dispersing agent such, for example, as Turkey red oil, is added, and the solution is made up to 800 parts by volume by the addition of ice and water and is thereby given the temperature of 5° C. The whole is then acidified with dilute acetic acid until the reaction is acid to litmus, 60 parts of crystalline sodium acetate are added, and a solution of the tetrazo-compound from 23.8 parts of 1:5-diaminoanthraquinone in 1000 parts of water is added while stirring in the course of about 30 minutes. The whole is stirred for 2 hours at 5–8° C., and then heated in the course of one hour to 35–40° C. and stirred at that temperature for a further 4 hours. The water-insoluble yellow dyestuff so formed is filtered off, washed free from salts with a large quantity of water, and dried in vacuo at 50° C. There is obtained a yellow powder which dissolves in concentrated sulfuric acid with a reddish yellow coloration. When incorporated by rolling into polyvinyl chloride, there is obtained a strong pure yellow coloration possessing a very good fastness to migration and light.

By replacing in this Example the 1-acetoacetylamino-2-chlorobenzene by 55.9 parts of 1-acetoacetylamino-2-chloro-5-trifluoromethylbenzene, there is obtained a dyestuff which dissolves in concentrated sulfuric acid with a yellow coloration, and which yields, when incorporated by rolling into polyvinyl chloride, strong pure greenish yellow colorations having very good properties. This dyestuff corresponds to the formula

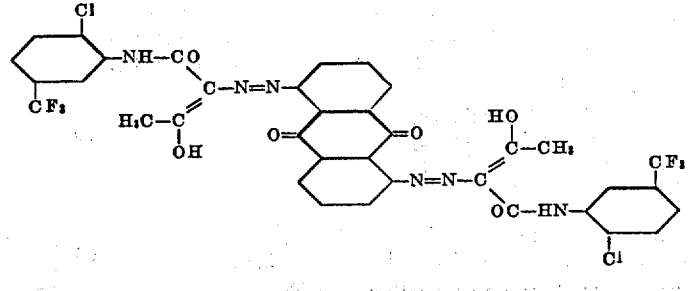

In the following table are given a few further disazo dyestuffs obtainable in the manner described in this example from 1 mol of tetrazotized 1:5-diamino-anthraquinone and 2 mols of the azo components set out in column I, which dyestuffs yield, when incorporated by rolling into polyvinyl chloride, the tins given in column II:

|   | I. Azo component | II. Tint |
|---|---|---|
| 1 | Acetoacetylaminobenzene | pure yellow. |
| 2 | 1-Acetoacetylamino-4-methyl-benzene | pure very strong yellow. |
| 3 | 1-Acetoacetylamino-2-methoxybenzene | yellowish orange. |
| 4 | 1-Acetoacetylamino-2:5-dichlorobenzene | greenish yellow. |
| 5 | 1-Acetoacetylamino-2:4-dimethyl-5-chlorobenzene | pure yellow. |
| 6 | 1-Acetoacetylamino-2-chloro-4-acetylamino-5-methoxybenzene | orange. |
| 7 | 1-Acetoacetylamino-2-chloro-5-trifluoromethylbenzene | greenish yellow. |
| 8 | 2-Acetoacetylamino-6-ethoxybenzthiazole | yellowish orange. |
| 9 | 1-Acetoacetylamino-2:5-dimethoxy-4-chlorobenzene | orange. |
| 10 | 1-Acetoacetylaminobenzene-3-sulfonic acid amide | Do. |
| 11 | 1-Acetoacetylamino-2-methoxy-5-methylbenzene | reddish yellow. |
| 12 | 1-Phenyl-3-methyl-5-pyrazolone | reddish orange. |
| 13 | 1-(2'-chlorophenyl)-3-methyl-5-pyrazolone | orange. |
| 14 | 1-Benzoylacetylamino-2-methoxy-5-methylbenzene | reddish yellow. |

Following is the formula of a representative dyestuff of the foregoing table:

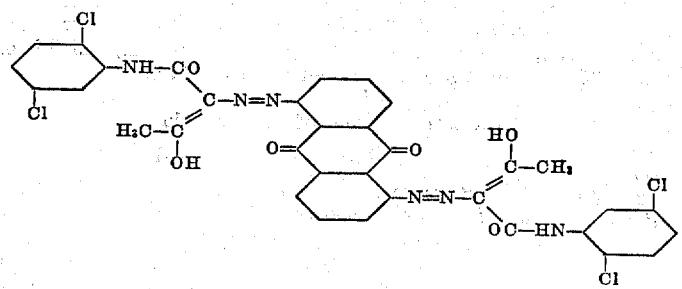

Example 2

58.6 parts of 1-(2'-hydroxy-3'-naphthoylamino)-2-methoxybenzene are dissolved with the aid of 30 parts of sodium hydroxide solution of 30 percent strength and 100 parts of alcohol in 800 parts of water. A dispersing agent such as Turkey red oil is added, the mixture is made up with ice and water to 1200 parts by volume whereby it is given the temperature of 0° C., and then acidified with dilute acetic acid until the mixture turns litmus red. After the addition of 60 parts of crystalline sodium acetate, the whole is run in the course of about 30 minutes into a solution of the tetrazo compound from 23.8 parts of 1:5-diaminoanthraquinone in 1000 parts of water. The whole is stirred for 2 hours at 5–10° C., then slowly heated to 40–45° C. and stirred for a further 4 hours at that temperature. The water-insoluble dyestuff formed is then filtered off and washed free from salts with water. After drying it in vacuo at 50–60° C. there is obtained a dark red powder, which dissolves in concentrated sulfuric acid with a blue-red coloration and gives strong bluish red colorations of good fastness to migration and light when incorporated in polyvinyl chloride.

By using in this example, instead of 1-(2'-hydroxy-3'-naphthoylamino)-2-methoxybenzene, the corresponding quantity of 1-(2'-hydroxy-3'-naphthoylamino)-benzene, there is obtained a dyestuff which dissolves in concentrated sulfuric acid with a red coloration and gives powerful pure red tints of good fastness to light when incorporated in polyvinyl chloride.

Example 3

42.3 parts of 1-acetoacetylamino-2-chlorobenzene are dissolved with 30 parts of sodium hydroxide solution of 30 percent strength in 300 parts of water. After the addition of a dispersing agent, for example, Turkey red oil, the solution is made up to 800 parts by volume and given a temperature of 5° C. by the addition of ice and water. The whole is then mixed with dilute acetic acid until the reaction is acid to litmus, and 60 parts of crystalline sodium acetate are then added.

At the same time 23.8 parts of 2:6-diaminoanthraquinone are tetrazotized as described in the first paragraph of Example 1, the tetrazo-compound is separated, and dissolved in 1000 parts of water. The clear solution of the tetrazo-compound is run, in the course of 30 minutes while stirring well, into a suspension of 1-acetoacetylamino-2-chlorobenzene, and the whole is stirred for 2 hours at 5–8° C. The whole is then slowly heated to 40–50° C., and stirred for a further 4 hours at that temperature. The dyestuff formed is then filtered off and washed free from salts with water. After drying the dyestuff in vacuo, it is obtained in the form of a yellow powder, which dissolves in concentrated sulfuric acid with a yellow coloration. When incorporated by rolling into polyvinyl chloride the dyestuff yields strong greenish yellow tints of very good fastness to migration and light.

In the following table are given a few further disazo dyestuffs obtainable in the manner described in this example from 1 mol of tetrazotized 2:6-diaminoanthraquinone and 2 mols of the azo components given in column I.

|   | I. Azo component | II. Tint on polyvinyl chloride |
|---|---|---|
| 1 | 1-Acetoacetylaminobenzene | greenish yellow. |
| 2 | 1-Acetoacetylamino-2:5-dichlorobenzene | Do. |
| 3 | 1-Acetoacetylamino-4-methyl-benzene | Do. |
| 4 | 1-Acetoacetylamino-2-methoxybenzene | pure yellow. |
| 5 | 1-Acetoacetylamino-2:5-dimethoxy-4-chlorobenzene | Do. |
| 6 | 1-(2'-chlorophenyl)-3-methyl-5-pyrazolone | yellowish orange. |
| 7 | 2'-Hydroxy-3'-naphthoylamino-benzene | pure red. |
| 8 | 1-(2'-Hydroxy-3'-naphthoylamino)-2-methoxybenzene | bluish red. |

Example 4

67.3 parts of 2-hydroxycarbazole-3-carboxylic acid-(4'-chlor)-anilide are dissolved with the aid of 30 parts of sodium hydroxide solution of 30 percent strength and 100 parts of alcohol in 800 parts of water. A dispersing agent such as Turkey red oil is added, the mixture is made up to 1200 parts by volume and given a temperature of 5° C. by the addition of ice and water, and the whole is acidified with dilute acetic acid until its turns litmus red. After the addition of 60 parts of crystalline sodium acetate, there is run in in the course of about 1½ hours a solution of the tetrazo compound from 23.8 parts of 1:5-diaminoanthraquinone in 1000 parts of water. The whole is stirred for 2 hours at 8–12° C., then slowly heated to 50° C., and the whole is stirred at that temperature for 6 hours. The dyestuff formed is then filtered off and washed with hot water until the filtrate is practically free from salts. After drying the product in vacuo at 50–60° C., there is obtained a brown powder, which dissolves in concentrated sulfuric acid with a blue coloration and yields strong brown tints when incorporated by rolling into polyvinyl chloride.

By using in this example, instead of 2-hydroxycarbazole-3-carboxylic acid-(4'-chlor)-anilide, the corresponding quantity of 2-hydroxydiphenylene oxide-3-carboxylic acid-(2':5'-dimethoxy)-anilide, there is obtained a black-brown powder which dissolves in concentrated sulfuric acid with a violet coloration and yields strong dark brown tints when incorporated by rolling into polyvinyl chloride.

*Example 5*

42.6 parts of 5:8-dichloro-1-hydroxynaphthalene are dissolved in 500 parts of water with the aid of 30 parts of sodium hydroxide solution of 30 percent strength. After the addition of a dispersing agent such as Turkey red oil, the solution is made up to 800 parts by volume and given a temperature of 10° C. with ice and water. The whole is then mixed with dilute acetic acid until the reaction is acid to litmus, and 60 parts of crystalline sodium acetate are added. At the same time 23.8 parts of 1:5-diaminoanthraquinone are tetrazotized as described in the first paragraph of Example 1, and the separated tetrazo-compound is dissolved in 1000 parts of water. The clear solution of the tetrazo-compound is run, while stirring, at 10–15° C. into the coupling suspension, and the whole is stirred for 2 hours at 10–15° C. The whole is then slowly heated to 30–40° C., and stirring is continued for a further 4 hours at that temperature. The precipitated dyestuff is then filtered off and washed free from salts with hot water. After drying the product in vacuo at 60–70° C., there is obtained a dark red soft powder, which dissolves in concentrated sulfuric acid with a blue green coloration and yields strong red tints when incorporated by rolling into polyvinyl chloride.

By using in this example, instead of 1:5-diaminoanthraquinone, the same quantity of 2:6-diaminoanthraquinone as tetrazo component, there is obtained a bright red powder which dissolves in concentrated sulfuric acid with a blue green coloration and yields powerful red tints when incorporated by rolling into polyvinyl chloride.

*Example 6*

160 parts of concentrated sulfuric acid are cooled to 0° C., and then 14 parts of sodium nitrite of 100 percent strength are introduced at 0–10° C. The whole is then slowly heated to 50–60° C. until a clear solution is obtained, the solution is then cooled to 30° C., and 39.6 parts of 2:6-diamino-3:7-dibromanthraquinone are added at 30–40° C., while stirring. The whole is then stirred for one hour at 50–55° C., cooled to 15° C., and the solution is poured on to 300 parts of ice. In this manner the tetrazo-compound crystallizes out in the form of yellow crystals. The whole is stirred for one hour at 0–5° C., and the crystals are filtered off and washed with a small amount of ice water.

42.3 parts of 1-acetoacetylamino-2-chlorobenzene are dissolved in 300 parts of water at 30° C. with the aid of 30 parts of sodium hydroxide solution of 30 percent strength. A dispersing agent such as Turkey red oil is added, and the solution is made up to 800 parts by volume and given a temperature of 10° C. by the addition of ice and water. The solution is then acidified with dilute acetic acid until the reaction is acid to litmus, 60 parts of crystalline sodium acetate are added, and the tetrazo-compound dissolved in 1000 parts of water is run in, while stirring, in the course of about one hour. The whole is then stirred for 2 hours at 10–15° C., heated to 40–50° C., and stirred for 4 hours at that temperature. The water insoluble yellow dyestuff so formed is then filtered off, washed free from salts with hot water, and dried in vacuo at 50–60° C. There is obtained a yellow powder which dissolves in concentrated sulfuric acid with a red yellow coloration and yields strong yellow tints having good properties of fastness when incorporated by rolling into polyvinyl chloride.

Dyestuffs having similar properties are obtained by using this example, instead of 2:6-diamino-3:7-dibromanthraquinone, the corresponding quantity of 2:6-diamino-1:3:5:7-tetrabromanthraquinone or 2:6-diamino-1:5-dichloranthraquinone.

*Example 7*

65 parts of polyvinyl chloride, 35 parts of dioctyl phthalate and 0.5 part of the dyestuff obtained as described in the first and second paragraphs of Example 1 are stirred together, and the mixture so obtained is then worked to and fro between the two rollers of a calender for about 3 minutes at about 140–145° C. There is obtained a foil having a strong pure yellow tint, which is of very good fastness to light and migration.

What is claimed is:

1. A disazo dyestuff of the formula

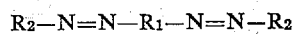

in which $R_1$ represents an anthraquinone radical free from groups imparting water-solubility containing as substituents, in addition to the two azo linkages, at most halogen atoms selected from the group consisting of chlorine and bromine atoms, and in which the two carbon atoms to which the azo linkages are bound are separated from one another by at least three carbon atoms of the anthraquinone nucleus, and $R_2$ represents an acetoacetylaminobenzene radical free from groups imparting water-solubility and bound to the azo linkage in α-position vicinal to a hydroxyl group.

2. A disazo dyestuff of the formula

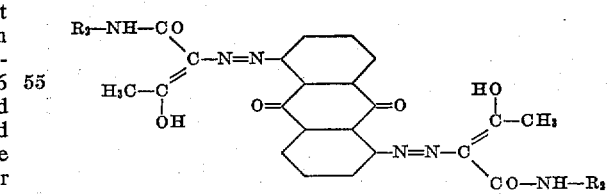

in which $R_2$ represents a benzene radical free from groups imparting water-solubility.

3. The disazo dyestuff of the formula

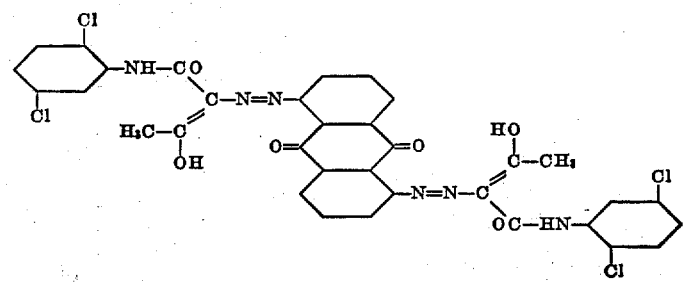

4. The disazo dyestuff of the formula
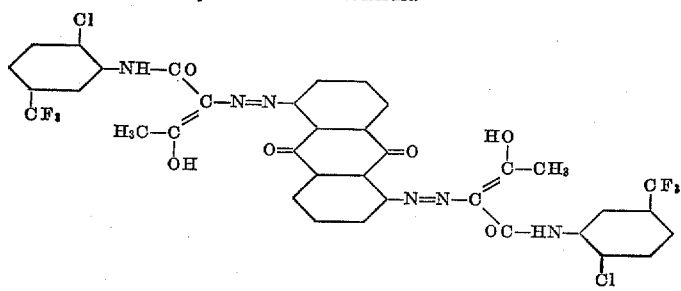
References Cited in the file of this patent
UNITED STATES PATENTS
| | | |
|---|---|---|
| 1,121,026 | Laska et al. | Dec. 15, 1914 |
| 1,505,568 | Laska et al. | Aug. 19, 1924 |
| 2,115,412 | Dahlen et al. | Apr. 26, 1938 |
| 2,457,823 | Kendall | Jan. 4, 1949 |
OTHER REFERENCES
Kacer et al.: Ber. Deut. Chem., vol. 37, 1905, pages 4185–4187.

UNITED STATES PATENT OFFICE

CERTIFICATE OF CORRECTION

Patent No. 2,798,064                                           July 2, 1957

Willy Mueller

It is hereby certified that error appears in the printed specification of the above numbered patent requiring correction and that the said Letters Patent should read as corrected below.

Column 2, line 37, for "amid," read -- amide, --; column 3, line 22, for "tetrazo-compound" read -- tetrazo-compounds --; column 4, line 6, after "examples" strike out the comma; column 5, line 6, for "tins " read -- tints --; column 8, line 22, after "using" insert -- in --.

Signed and sealed this 24th day of September 1957.

(SEAL)
Attest:

KARL H. AXLINE                                                    ROBERT C. WATSON
Attesting Officer                                       Commissioner of Patents